(12) United States Patent
Schempp et al.

(10) Patent No.: US 8,192,876 B2
(45) Date of Patent: Jun. 5, 2012

(54) METHOD FOR OPERATING A FUEL CELL SYSTEM IN A MODE OF REDUCED POWER OUTPUT

(75) Inventors: Volker Schempp, Holzmaden (DE); Hans-Frieder Walz, Bad Ueberkingen (DE); Joerg Schuetz, Ludwigsburg (DE)

(73) Assignee: Daimler AG, Stuttgart (DE)

( * ) Notice: Subject to any disclaimer, the term of this patent is extended or adjusted under 35 U.S.C. 154(b) by 398 days.

(21) Appl. No.: 12/444,476

(22) PCT Filed: Sep. 22, 2007

(86) PCT No.: PCT/EP2007/008259
§ 371 (c)(1),
(2), (4) Date: Apr. 6, 2009

(87) PCT Pub. No.: WO2008/049493
PCT Pub. Date: May 2, 2008

(65) Prior Publication Data
US 2010/0003551 A1 Jan. 7, 2010

(30) Foreign Application Priority Data
Oct. 25, 2006 (DE) .......................... 10 2006 050 182

(51) Int. Cl.
*H01M 8/00* (2006.01)
(52) U.S. Cl. ...................... 429/400; 429/423
(58) Field of Classification Search .................. 429/12, 429/13, 17, 19, 22, 23, 30–35, 400–402, 429/404, 411, 422, 423, 430, 433, 436
See application file for complete search history.

(56) References Cited

U.S. PATENT DOCUMENTS

| | | | | |
|---|---|---|---|---|
| 6,461,751 B1 * | 10/2002 | Boehm et al. | ................. | 429/432 |
| 6,514,635 B2 * | 2/2003 | Van Dine et al. | ............. | 429/415 |
| 6,635,370 B2 * | 10/2003 | Condit et al. | ................. | 429/415 |
| 6,645,654 B2 * | 11/2003 | Yagi | ............................... | 429/413 |
| 6,696,190 B2 * | 2/2004 | Haridoss | ....................... | 429/431 |
| 6,701,229 B2 * | 3/2004 | Iwasaki | ........................... | 701/22 |
| 6,866,954 B2 * | 3/2005 | Hayashi et al. | ............... | 429/461 |
| 6,920,948 B2 * | 7/2005 | Sugiura et al. | ............. | 180/65.28 |
| 2001/0055705 A1 | 12/2001 | Yagi | | |
| 2002/0096376 A1 * | 7/2002 | Iwasaki | ........................ | 180/65.2 |
| 2002/0162694 A1 * | 11/2002 | Iwasaki | ........................ | 180/65.3 |
| 2002/0182456 A1 | 12/2002 | Condit et al. | | |
| 2004/0013920 A1 * | 1/2004 | Hasuka et al. | .................. | 429/23 |

FOREIGN PATENT DOCUMENTS

| | | |
|---|---|---|
| DE | 10059393 A1 | 6/2002 |
| DE | 102004034071 A1 | 2/2006 |
| JP | 11026003 A | 1/1999 |
| WO | 0245247 A2 | 6/2002 |
| WO | 2006007940 A1 | 1/2006 |

* cited by examiner

*Primary Examiner* — Thanh Tam Le
(74) *Attorney, Agent, or Firm* — Patent Central LLC; Stephan A. Pendorf

(57) ABSTRACT

The invention relates to a method for operating a fuel cell system in a mode of reduced power output. The fuel cell system comprises a fuel cell stack (BS) having at least one fuel cell (BZ) with an anode (A), a cathode (K), and a proton exchange membrane, anode and cathode inlets, anode and cathode outlets, and a hydrogen and air supply. In order not to adversely affect the life span of the fuel cell system, the air supply to the cathode (K) is interrupted during the changeover to the mode of reduced power output, and an electric voltage (U) of the fuel cell stack (BS) is reduced by means of a current pulse.

13 Claims, 3 Drawing Sheets

METHOD FOR OPERATING A FUEL CELL SYSTEM IN A MODE OF REDUCED POWER OUTPUT

Figure 1:
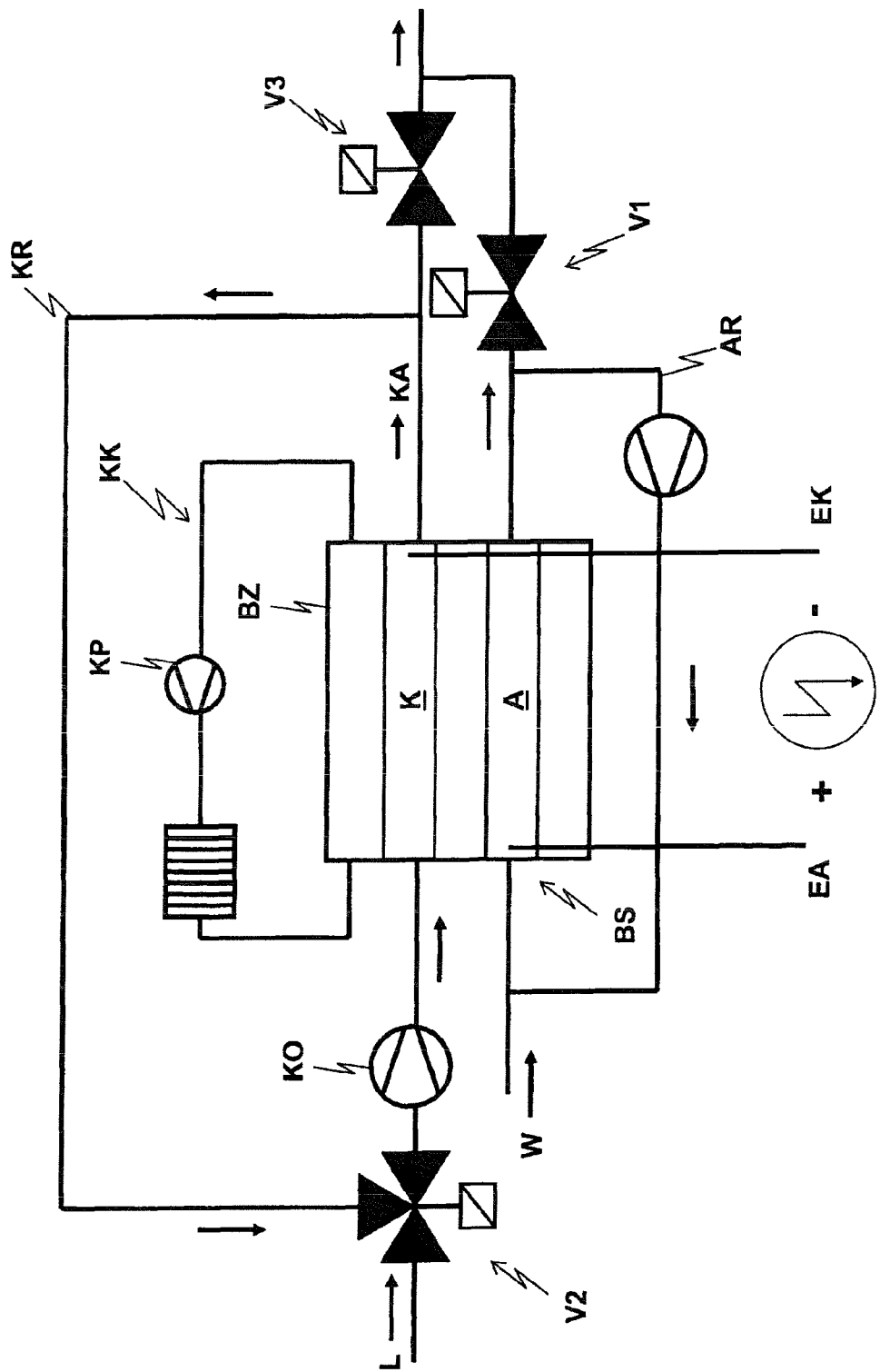

The invention relates to a method for operating a fuel cell system in a mode of reduced power output which has no negative effect on the life cycle of the fuel cell system.

Fuel cell system are used in many applications as an energy source, for example in vehicles for the drive or for other units. Fuel cells with a proton exchange membrane (PEM) are the most widely used here, where the anode of the fuel cell is supplied with hydrogen as fuel, and the cathode with oxygen or air as oxidation means. The anode and cathode are separated by a proton-permeable, electrically non-conducting membrane. Electrical energy is produced during the electrochemical reaction of the hydrogen and the oxygen to water, which is taken off by electrodes at the anode and cathode. This reaction can only be maintained if the current resulting therefrom is discharged from the fuel cell. Several individual fuel cells connected electrically in series are combined to a fuel cell stack.

The cathode of the fuel cell is usually supplied with air as oxygen-rich gas, and not pure oxygen, in particular with mobile uses. Thus, if air is mentioned in the following, this is also representative for pure oxygen or a gas with another part of oxygen.

From DE 103 32 129 A1 is known and operating system for a vehicle with a fuel cell, where the fuel cell is operated in three different energy generating modes, a normal energy generating mode, an idle stop mode, and an idle charge mode. In the normal energy generation mode, the operating system adjusts the current generated by the fuel cell in dependence on the respective current demand for the drive motor and for additional devices. In the idle stop mode, the operating system stops the energy generation of the fuel cell, that is, the operating system sets the current to be generated by the fuel cell to zero. In the idle charge mode, the operating system adjusts the current generated by the fuel cell according to the optimum efficiency of the fuel cell to charge an energy store. The control of the current generation of the fuel cell takes place by controlling the respective amount of reaction gases, which contain oxygen and hydrogen.

It is the object of the invention to propose a method for operating a fuel cell system in a mode of reduced power output which has no negative effect on the life cycle of the fuel cell system.

In accordance with the invention, during the change into the mode of reduced power output, the air supply to the cathode is interrupted accordingly, and an electric voltage of the fuel cell stack is reduced by means of a current pulse. This method has the advantage that the current pulse initiates an increased use of the oxygen in the cathode, and that the electric voltage of the fuel cell stack thus decreases rapidly in a short period of time. Thus, with a further operation with reduced power output, which can mean zero watt in the extreme case, high voltage potentials in the fuel cell cannot result, which again would lead to a reduction of the life cycle of the fuel cell.

The method according to the invention additionally leads to a usage and noise reduction in a mode of reduced power output.

The regulation of the electric voltage of the fuel cell stack advantageously takes place with a DC-DC transformer or with an adjustable electric load. Especially with the regulation by a DC-DC transformer, the electric voltage can be brought below an upper voltage limit value of a working region within a time which is as short as possible.

The electric voltage of the fuel cell stack is regulated by means of an adjustable electric load, for example a cooling means pump in such a manner, that it is below an upper voltage limit value and above a lower voltage limit value of a working region. A degradation of the fuel cell can thus be avoided. An operation of the cooling means pump advantageously leads to an even temperature distribution in the fuel cell. So as to keep the electric voltage of the fuel cell stack above the lower voltage limit value of the working region, oxygen is again supplied before exceeding the lower voltage limit value. Alternatively, an energy store can be used as adjustable electric load, which optimizes the operating mode from an energetic view.

If the hydrogen supply to the anode is not interrupted during the change into the mode of reduced power output, this is advantageous for a change back into a mode of normal power output. Potential displacements within the fuel cell are also avoided hereby, which would have a negative effect on the life cycle of the electrodes.

A return of the depleted cathode air into the cathode via a cathode recirculation circuit advantageously leads to an avoiding of local oxygen deficiency in the cathode. If alternatively a return of the cathode air is foregone, this leads to a simplification of the fuel cell system and to an increase of the energy efficiency.

Figure 2:
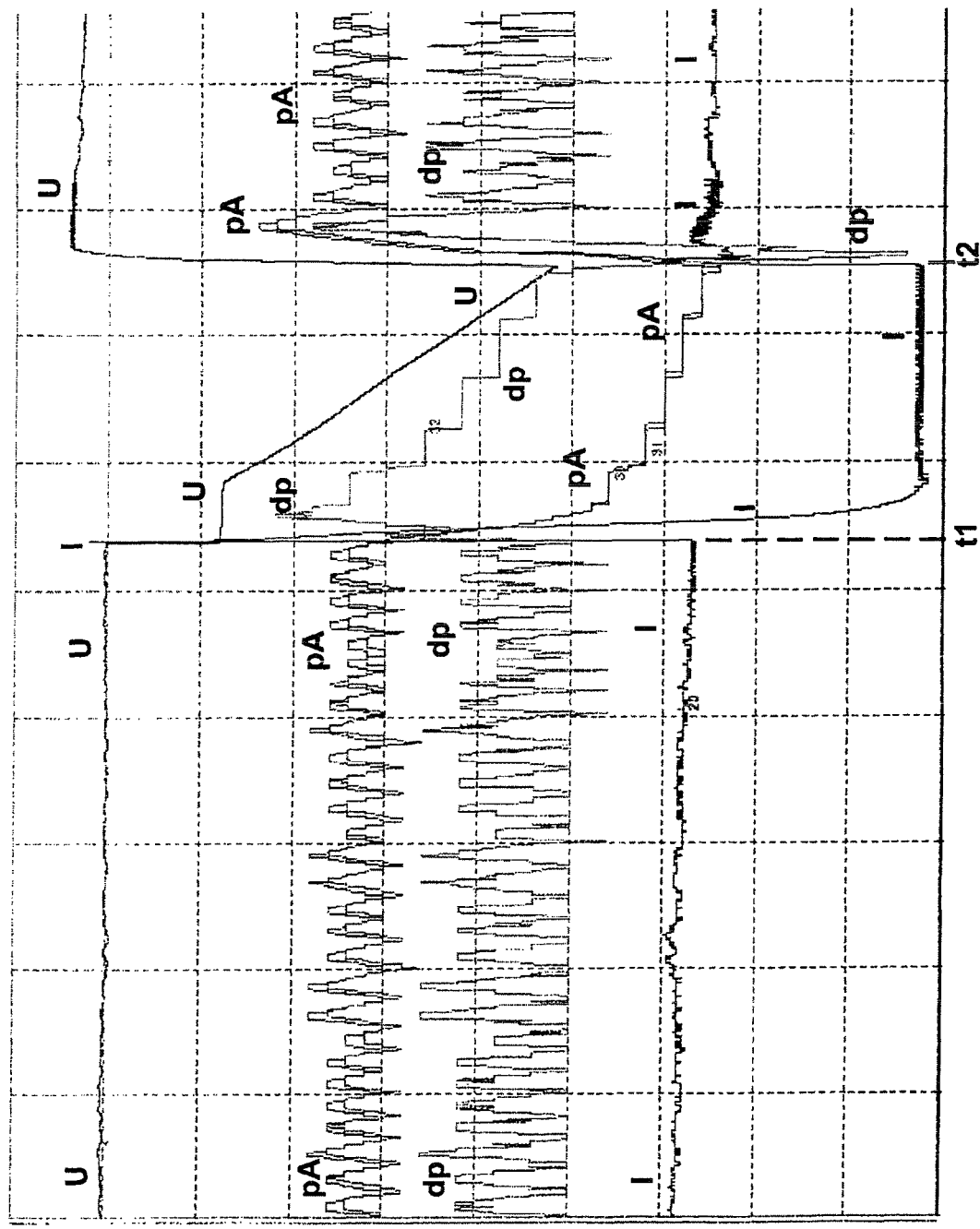
Figure 3:
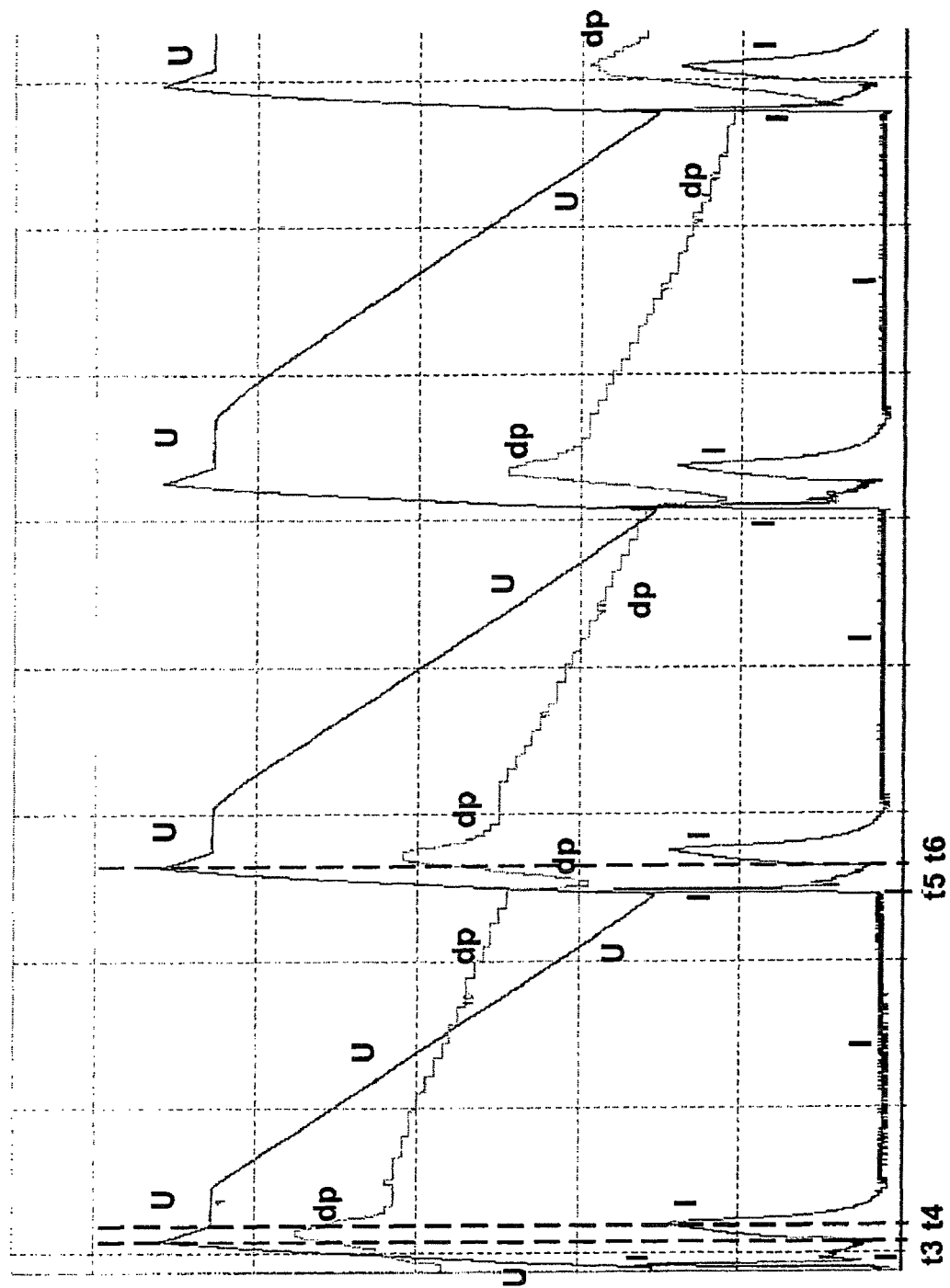

Further advantages of the invention result from the description and the drawing. Concrete embodiments of the invention are shown simplified in the drawing and are explained in more detail in the following description. It shows:

FIG. 1 a schematic representation of a fuel cell system,

FIG. 2 a temporal progression of an electric current or an electric voltage of a fuel cell stack, an anode pressure, and a differential pressure between anode and cathode with the changeover to the mode of reduced power output according to the invention, and FIG. 3 a temporal progression of an electric current or an electric voltage of a fuel cell stack, and of a differential pressure between anode and cathode with a regulation of the electric voltage of the fuel cell stack within a working region according to the invention.

FIG. 1 shows a fuel cell system with a fuel cell stack BS, wherein only one fuel cell BZ is shown for clarity. The fuel cell BZ comprises an anode A and a cathode K. Hydrogen or hydrogen-rich gas is supplied to the anode A from a hydrogen tank, not shown, preferably a pressure tank, or a reformer system. When using a hydrogen tank, the fuel cell system has an anode recirculation circuit AR, through which hydrogen W can be conducted from one anode outlet to an anode inlet. The anode recirculation circuit AR has means for controlling the recirculation amount. The recirculation amount or the amount of hydrogen W discharged by the fuel cell system can further be controlled by an adjustable valve V1. When using a reformer system, the recirculation on the anode side can be foregone.

The amount of oxygen supplied to the cathode K, preferably as air L, can be controlled by a by an adjustable three-way valve V2 and by a compressor KO.

In an advantageous manner, the amount of the hydrogen W supplied to the anode A is controlled in dependence on the feed rate of the compressor KO.

The depleted cathode air KA can again be returned to the cathode K via a cathode recirculation circuit KR. A control hereby takes place by the adjustable three-way valve V2, and also by an adjustable valve V3.

The cooling of the fuel cell BZ or an even temperature distribution in the fuel cell BZ takes place through a cooling means circuit KK, which comprises a cooling means pump KP.

The electrical energy generated by the electrochemical reaction of the hydrogen W and the oxygen to water is taken off by an anode electrode EA and a cathode electrode EK. The fuel cells BZ of the fuel cell stack BS are hereby connected in series electrically and are connected to a DC-DC transformer, not shown, through which the electric voltage and the electric current of the fuel cell stack BS can be regulated.

The DC-DC transformer is preferably electrically connected to the cooling means pump KP, the compressor KO, further electric users, and an energy store, not shown.

In FIG. 2 is shown a temporal progression of an electric current I or an electric voltage U of a fuel cell stack BS, called stack current I or stack voltage U in the following, of an anode pressure pA, and of a differential pressure dp between anode A and cathode K of a fuel cell BZ with the changeover to the mode of reduced power output according to the invention.

As mode of reduced power output is meant an operation of the fuel cell system, where the fuel cell stack BS only has to generate electric current I below a normal current demand, as the vehicle is for example in an idle operation (idle), for example in vehicle standstill, or in a thrust operation, that is, the vehicle does not have to be operated by the drive motor.

At a time t1 according to FIG. 2, the fuel cell system changes to a mode of reduced power output. Here, the compressor KO is first switched off and an air supply to the cathode K is interrupted. A current pulse I is then generated by a regulation of the DC-DC transformer, which leads to an increased use of the oxygen in the cathode K and to a fall of the stack voltage U in a shortest time. The current pulse is meant to be here a short-term increase of the stack current I. The stack current I is hereby preferably supplied to an electric user, especially preferred to the cooling means pump KP, or an electrical energy store.

In the further progression of the mode of reduced power output, the stack current I on a low level is virtually constant. The stack voltage U decreases continually.

Due to an interruption of the hydrogen supply and the usage of the hydrogen W in the anode A, the anode pressure pA also reduces continually. The hydrogen pressure can hereby be maintained over the pressure level of the air L on the cathode K by means of a regulation device.

It is also possible not to interrupt the hydrogen supply to the anode A during the changeover into the mode of reduced power output.

So that no current flows into the fuel cell stack BS during the operation in the mode of reduced power output, and thus leads to a damage of the fuel cell stack BS, a current flow from the fuel cell stack BS is ensured. The stack current I is hereby also preferably supplied to the cooling means pump, to an electric user, or to an electrical energy store. Air replenishing the cathode, for example due to leakages, can likewise be used.

The operation in the mode of reduced power output is ended at a time t2, and the stack current I and the stack voltage U increase again to a normal level as before the operation in the mode of reduced power output.

FIG. 3 shows a temporal progression of a stack current I or stack voltage U and of a differential pressure between anode A and cathode K with a regulation of the stack voltage according to the invention within a working region limited by an upper and a lower voltage limit value.

At a time t3 according to FIG. 3, the fuel cell system changes to a mode of reduced power output corresponding to the method according to FIG. 2. The compressor KO is hereby first switched off and an air supply to the cathode K is interrupted. A current pulse I is then generated by a regulation of the DC-DC transformer, which leads to an increased use of the oxygen in the cathode K and to a fall of the stack voltage U.

The regulation of the DC-DC transformer is switched over at the time t4 in such a manner that a reduction of the stack voltage U as slow as possible is ensured, but that flowing back of the current I into the fuel cell stack BS is prevented at the same time.

In the further progression of the mode of reduced power output, the stack current I on the low level is virtually constant. This leads to a continual reduction of the stack voltage U.

The compressor KO is again activated and air L is supplied to the cathode K, before the stack voltage U falls below the lower voltage limit value of the working region at a time t5.

The stack voltage U thus increases again until a time t6 to the upper voltage limit value of the working region, where the method is repeated corresponding to the time t3, until the operation in the mode of reduced power output is ended.

The invention claimed is:

1. A method for operating a fuel cell system in a normal mode and a mode of reduced power output, wherein the fuel cell system comprises a fuel cell stack (BS) having at least one fuel cell (BZ) with an anode (A), a cathode (K), a proton exchange membrane, an anode fuel inlet, a cathode oxidant inlet, an anode outlet, a cathode outlet, a hydrogen supply and an oxidant supply, wherein the oxidant is air, the method comprising:
   interrupting the air supply to the cathode (K) side of the fuel cell during the changeover from the normal mode to the mode of reduced power output, and
   reducing the electric voltage (U) of the fuel cell stack (BS) by application of a current pulse.

2. The method according to claim 1, wherein the electric voltage (U) of the fuel cell stack (BS) is regulated by means of an adjustable electric load (KP) in such a manner, that it is within a working region limited by an upper and a lower voltage limit value.

3. The method according to claim 1, wherein the electric voltage (U) of the fuel cell stack (BS) is regulated by a DC-DC transformer.

4. The method according to claim 1, wherein the electric voltage (U) of the fuel cell stack (BS) is regulated by an adjustable electric load (KP).

5. The method according to claim 1, wherein the hydrogen supply to the anode (A) is not interrupted during the changeover to the mode of reduced power.

6. The method according to claim 1, wherein depleted cathode air (KA) is again returned to the cathode (K) via a cathode recirculation circuit (KR).

7. The method according to claim 1, wherein oxygen is again supplied to the cathode (K), before the electric voltage (U) of the fuel cell stack (BS) sinks below a lower voltage limit value.

8. The method according to claim 1, wherein the electric voltage (U) of the fuel cell stack (BS) is regulated by a DC-DC transformer.

9. The method according to claim 1, wherein the electric voltage (U) of the fuel cell stack (BS) is regulated by an adjustable electric load (KP).

10. The method according to claim 1, wherein the hydrogen supply to the anode (A) is not interrupted during the changeover to the mode of reduced power.

11. The method according to claim 1, wherein depleted cathode air (KA) is again returned to the cathode (K) via a cathode recirculation circuit (KR).

12. The method according to claim 1, wherein oxygen is again supplied to the cathode (K), before the electric voltage (U) of the fuel cell stack (BS) sinks below a lower voltage limit value.

13. A method for operating a fuel cell system in a normal mode and a mode of reduced power output, wherein the fuel cell system comprises a fuel cell stack (BS) having at least one fuel cell (BZ) with an anode (A), a cathode (K), a proton exchange membrane, an anode fuel inlet, a cathode oxidant inlet, an anode outlet, a cathode outlet, a hydrogen supply and an oxidant supply, wherein the oxidant is air, the method comprising:

supplying hydrogen and air to the fuel cell to produce electrical energy, interrupting the air supply to the cathode (K) side of the fuel cell during the changeover from the normal mode to the mode of reduced power output, reducing an electric voltage (U) of the fuel cell stack (BS) by application of a current pulse sufficient to initiate an increased use of the oxygen in the cathode and rapidly decrease the electric voltage of the fuel cell stack to the mode of reduced power output, and in the mode of reduced power output, regulating the electric voltage of the fuel cell stack by regulating an adjustable electric load so that the voltage is maintained below an upper voltage limit value and by supplying oxygen before exceeding the lower voltage limit value to maintain the electric voltage above a lower voltage limit value.

* * * * *